(12) United States Patent
Koelsch

(10) Patent No.: US 10,850,698 B2
(45) Date of Patent: Dec. 1, 2020

(54) FLEXIBLE VEHICLE DOOR WITH AIRBAG

(71) Applicant: FORD GLOBAL TECHNOLOGIES, LLC, Dearborn, MI (US)

(72) Inventor: Markus Koelsch, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 16/246,488

(22) Filed: Jan. 12, 2019

(65) Prior Publication Data

US 2019/0217801 A1   Jul. 18, 2019

(30) Foreign Application Priority Data

Jan. 12, 2018   (DE) .................. 10 2018 200 494

(51) Int. Cl.
| | |
|---|---|
| *B60R 21/21* | (2011.01) |
| *B60J 5/04* | (2006.01) |
| *B60R 21/217* | (2011.01) |
| *B60R 21/264* | (2006.01) |
| *B60R 21/232* | (2011.01) |
| *B60J 1/08* | (2006.01) |

(52) U.S. Cl.
CPC ............ *B60R 21/21* (2013.01); *B60J 5/0486* (2013.01); *B60R 21/217* (2013.01); *B60R 21/232* (2013.01); *B60R 21/264* (2013.01); *B60J 1/08* (2013.01)

(58) Field of Classification Search
CPC ................................................... B60R 21/21
See application file for complete search history.

(56) References Cited

U.S. PATENT DOCUMENTS

| | | | | |
|---|---|---|---|---|
| 5,324,072 A | * | 6/1994 | Olson | B60R 21/23138 |
| | | | | 280/728.2 |
| 5,730,464 A | * | 3/1998 | Hill | B60R 21/23138 |
| | | | | 280/730.2 |
| 6,773,031 B2 | * | 8/2004 | Haig | B60R 21/08 |
| | | | | 280/730.2 |
| 6,773,054 B2 | | 8/2004 | Martini | |
| 7,178,827 B2 | * | 2/2007 | Wu | B60R 21/08 |
| | | | | 280/730.2 |
| 7,413,215 B2 | | 8/2008 | Weston et al. | |
| 7,578,518 B2 | | 8/2009 | Ochiai et al. | |
| 7,578,520 B2 | * | 8/2009 | Palo | B60R 21/201 |
| | | | | 280/730.1 |
| 8,123,279 B2 | | 2/2012 | Orr et al. | |
| 8,596,673 B2 | * | 12/2013 | Ruedisueli | B60R 21/21 |
| | | | | 280/730.2 |

(Continued)

FOREIGN PATENT DOCUMENTS

| | | |
|---|---|---|
| DE | 10315622 A1 | 11/2004 |
| DE | 102008055712 A1 | 5/2010 |

OTHER PUBLICATIONS

DE Examination Report DE 10 2018 200 494.3 Filed Oct. 10, 2018. 7 pages.

(Continued)

*Primary Examiner* — Faye M Fleming
(74) *Attorney, Agent, or Firm* — Frank MacKenzie; Brooks Kushman P.C.

(57) ABSTRACT

A side door for a motor vehicle is formed from a flexible material such as a fabric and has a chamber formed therein which houses an occupant protection side airbag or curtain airbag.

13 Claims, 1 Drawing Sheet

(56) References Cited

U.S. PATENT DOCUMENTS

| | | |
|---|---|---|
| 9,073,412 B2 | 7/2015 | Dobrot et al. |
| 2004/0164528 A1* | 8/2004 | Boegge .................. B60R 21/21 280/730.2 |
| 2006/0175814 A1* | 8/2006 | Jang ........................ B60R 21/08 280/730.2 |
| 2016/0023543 A1 | 1/2016 | Rutland |

OTHER PUBLICATIONS

Bestop. 2-piece Full Fabric Door Set. https://www.bestop.com/products/1997-2006-2-piece-full-fabric-door-set/.

* cited by examiner

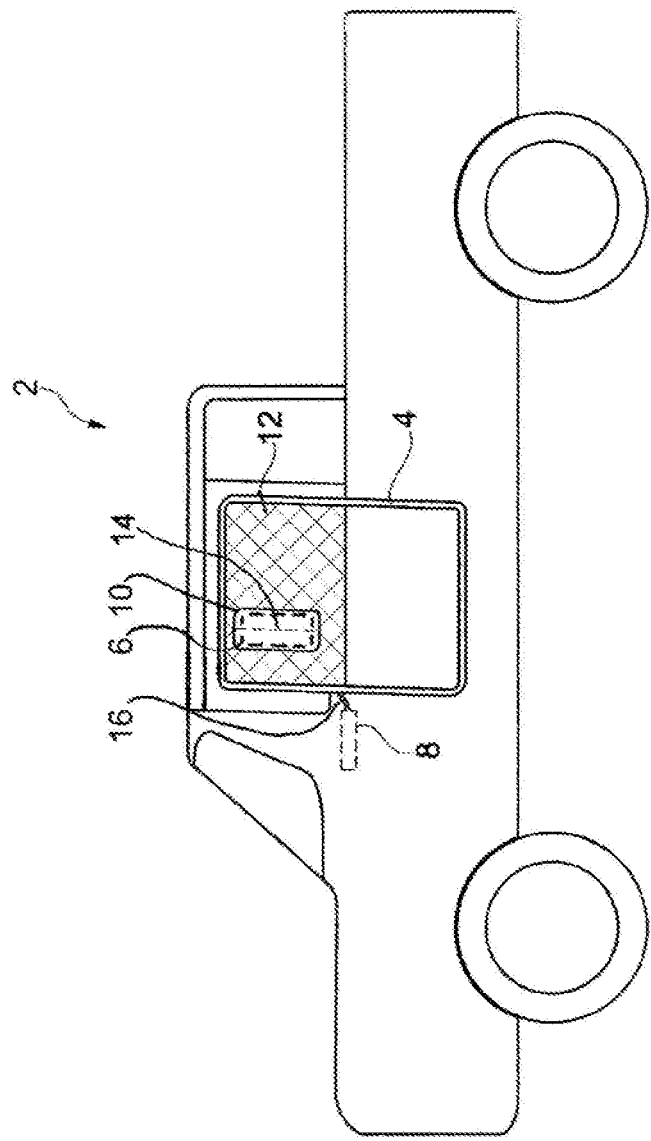

FLEXIBLE VEHICLE DOOR WITH AIRBAG

CROSS-REFERENCE TO RELATED APPLICATIONS

This application claims foreign priority benefits under 35 U.S.C. § 119(a)-(d) to DE Application 10 2018 200 494.3 filed Jan. 12, 2018, which is hereby incorporated by reference in its entirety.

TECHNICAL FIELD

The invention relates to a motor vehicle having a fabric door with accommodation for a passenger protection airbag.

BACKGROUND

Motor vehicles such as passenger cars, for example, have vehicle doors which allow a passenger space of the motor vehicle to be entered and left.

Customarily, vehicle doors are provided at least on both sides of the motor vehicle—one for the driver, another for a front-seat passenger. In addition, further doors can be provided for rear-seat passengers.

Vehicle doors are usually produced from the same material on the outside as the remainder of the motor vehicle body, for example from sheet steel, aluminum, or plastic materials. In order to protect the driver, front-seat passenger and any rear-seat passengers in the event of an accident, vehicle doors may be fitted with airbags, such as a side airbag or a curtain airbag.

A side airbag is typically arranged to deploy between a vehicle seat and a door trim panel of the vehicle door and is designed to reduce the risk of injury to the upper body by supporting the driver over a large area of the chest and pelvis, for example, and relieving the strain on the abdominal area. Side airbags of this kind are usually arranged in the door trim panel.

A curtain airbag is designed to prevent contact of a vehicle occupant's head with a side panel, B-pillar or penetrating objects and to support the head over a large area, in order to avoid lateral hyperextension of the cervical spine. Curtain airbags are activated in the event of a side collision, where necessary also during rollovers and severe frontal impacts. The curtain airbag is deployed along a side window opening of the motor vehicle and may cover the entire area of the pane. The curtain airbag may typically remain inflated for around 5 seconds and thereby also offers protection during rollovers or multiple collisions. The curtain airbag may be partially integrated in the door trim panel where appropriate.

It is also known in the art, however, for motor vehicles, in particular off-road vehicles, to have fabric doors instead of solid doors, said fabric doors being substantially made of a textile such as a plastics textile. However, fabric doors of this kind have no customary door trim panel for accommodating an airbag.

Since airbags are an essential constituent of a motor vehicle, in order to satisfy crash test requirements, e.g. according to Euro NCAP, there is a need for the safety of motor vehicles with fabric doors to be improved.

SUMMARY

The problem addressed by the invention is solved by a motor vehicle having a fabric door, wherein the fabric door accommodates or is equipped with an airbag.

In this case, a fabric door is understood to be a vehicle door which is made completely or primarily of a flexible material. In particular, planar constituents of the fabric door which simultaneously form the outside and inside of a door, for example, may be constructed from one or more flexible material. Flexible materials and components are characterized by the properties of a low modulus of elasticity, low extensional stiffness and large deformation due to low force and moment loading. Flexible materials and components are also referred to as dimensionally unstable, dimensionally weak or non-dimensionally stable materials and components. In addition, flexible materials and components may be regarded as non-dimensionally stable under the force of their own weight, i.e. they are deformed under their own weight.

An airbag is understood to be part of a motor vehicle's occupant restraint system. A known airbag may be formed from a plastic or other gas-impermeable material and is typically deployed within 20 to 50 milliseconds in the event of an accident. It prevents the driver, front-seat passenger or other passengers from hitting hard parts of the interior, e.g. steering wheel or dashboard of the motor vehicle.

By equipping a fabric door with an occupant protection airbag, safety can therefore be improved and the same degree of passenger protection achieved as with solid doors.

According to one embodiment, the airbag is configured as a side airbag. Hence, the risk of injury to the upper body in particular is reduced, as a side airbag supports the chest and pelvis over a wide area and relieves the strain on the abdomen.

According to a further or combined embodiment with a side airbag, the airbag is configured as a curtain airbag. The curtain airbag prevents contact with the side panel or B-pillar of the motor vehicle and also with penetrating objects and supports the head, e.g. the driver's head, over a large area, in order to avoid lateral hyperextension of the cervical spine.

According to a further disclosed feature, a gas generator is provided for inflating the airbag which is arranged in the motor vehicle or in the fabric door. In this case, the gas generator is arranged in the engine compartment or behind the dashboard of the motor vehicle, for example, and connected to the airbag by a gas-conveying line. Where necessary, the gas generator can be used to supply additional airbags, so that the number of gas generators may be smaller than the number of airbags in the motor vehicle.

According to a further disclosed feature, the fabric door has one or a plurality of chambers for housing the airbag in the non-inflated state. The chamber may be closed off by a plate made of a rigid material which opens in response the airbag inflation. Alternatively, the chamber may be completely enclosed by a textile which has a tear seam as the predetermined breaking point which is forced open when the airbag is inflated.

In addition, the invention includes a fabric door for a motor vehicle of this kind.

The invention is now explained with the help of a drawing in which:

BRIEF DESCRIPTION OF THE DRAWINGS

FIG. 1 shows a schematic representation of a motor vehicle with a fabric door with an airbag.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The motor vehicle 2 in the depicted exemplary embodiment is a passenger vehicle.

The motor vehicle 2 in this case is designed as a pick-up truck with a flat, open loading area (or bed) at the rear. Traditional pick-up trucks generally comprise a ladder frame with a cab or driver's compartment separately screwed thereon and a loading area (also bed) with a rigid rear axle and leaf suspension.

A pick-up may be designed as an off-road vehicle. Off-road vehicles are intended for use on very poor tracks and on unpaved terrain. This means that they must, in particular, be extremely robust and all-terrain in design. The off-road capability may be improved by a high ground clearance and short, frequently also beveled, body overhangs which help prevent overturning on steep gradients. Skid plates on the underside of the chassis protect sensitive components such as the fuel tank, engine, transmission and differentials against impact. Reliable forward propulsion is assisted by features such as four-wheel drive, often in conjunction with engageable short reduction gears and also differential lock(s), an interlockable chassis (partly with rigid axles) and off-road tires with deep treads. In a similar manner to trucks, many off-road vehicles today also still have a robust ladder, box or backbone chassis with a non-bearing body fitted on top.

Unlike in the present exemplary embodiment, the motor vehicle 2 may, however, also be configured as a different type of vehicle such as, for example, a sports car, a roadster, a cabriolet, a truck or a semitrailer, without solid vehicle doors in each case.

The motor vehicle 2 in the present exemplary embodiment has left and right side door openings (only the left side door opening being visible in FIG. 1), over each of which a fabric door 4 is secured. The fabric doors 4 are movable between the closed position (show) and an open position (not shown) to allow a driver and/or front-seat passengers to enter and exit the passenger space of the motor vehicle 2.

In order to keep the fabric door 4 in the closed position while driving and prevent the penetration of dirt and/or rain in the passenger space, a retaining cable, Velcro strip, zip fastener or similar is provided, in order to fix the fabric door 4 in the closed position over the door opening formed in the vehicle body.

The fabric door 4 primarily comprises a generally planar panel formed from one or more segments of flexible (non-rigid) material. The non-rigid material may be textile, such as a woven, knitted or crocheted fabric, a mesh or stitch-bonded fabric, for example. The planar textile panel in this case may be made of artificial (man-made) and/or natural fibers. Alternatively, the fabric door 4 may also be produced from a plastic film. Furthermore, the fabric door 4 may be designed to be sectionally opaque, i.e. impervious to light. In addition, the fabric door 4 may comprise a window portion 12, in other words, a light-permeable portion. In this portion, the fabric door 4 may comprise a transparent film made of plastic.

In the present exemplary embodiment, the fabric door 4 is essentially made of a flexible material. The planar textile structure and/or the plastic film is flexible in design. The flexible panel may be configured in such a manner that it becomes deformed under the force of its own weight.

In addition, the planar textile structure and/or the plastic film simultaneously form an outer panel and an inner panel of the fabric door 4. In other words, the fabric door 4 has no separately-formed inner door trim panel, meaning that it is inner door trim panel-free.

In order to improve safety of the vehicle occupants, the fabric door 4 is equipped with an airbag 6. An airbag 6 in this case is understood to be part of an occupant restraint system of the motor vehicle 2. The airbag 6 is made up of an air-tight bag which is deployed between the driver or other passengers and parts of the vehicle interior in the event of an accident. Deployment of such an airbag typically occurs within 20 to 50 milliseconds. This prevents the driver, front-seat passenger or other occupants from hitting hard parts of the interior, such as the steering wheel or dashboard of the motor vehicle 2, for example. The occupant restraint system is only actuated by high negative acceleration values beyond the kind of values reached by fully applying the brakes.

Apart from the airbag 6, an occupant restraint system of this kind has an airbag control unit with sensors for detecting negative acceleration values and at least one gas generator 8 which supplies gas to inflate the airbag 6 when triggered by the airbag control device. The gas generator 8 may be a pyrotechnical gas generator, a cold gas generator or a hybrid gas generator.

The airbag 6 may, for example, be configured as a side airbag and/or as a curtain airbag.

If the airbag 6 is designed as a side airbag, it is deployed within 20 ms between a vehicle seat and the fabric door 4. It thereby reduces the risk of injury to the upper body by supporting the driver over a large area of the chest and pelvis, for example, and relieving the strain on the abdominal area.

If the airbag 6 is configured as a curtain airbag it deploys along the plane of a side window opening of the motor vehicle 2 and preferably covers the entire area of the window pane. It prevents contact being made with a side panel, B-pillar or penetrating objects and protects the head over a large area, in order to prevent hyperextension of the cervical spine. A curtain airbag typically remains inflated for approximately 5 seconds and thereby also offers protection during rollovers or multiple collisions.

The gas generator 8 may be located in the engine compartment or behind the dashboard of the motor vehicle 2, for example. A gas-conveying line 16 connects the gas generator 8 to the airbag 6.

The fabric door 4 has a chamber 10 defined therein for accommodating the airbag in the non-inflated state. Consequently, the airbag 6 is integrated in the fabric door 4. In the present exemplary embodiment, the chamber 10 may be completely enclosed by a textile having a tear-seam 14 (depicted as a dashed line in FIG. 1) formed therein to serve as a predetermined breaking point and which fails to allow the airbag 6 to exit the chamber 10 when the airbag expands when inflated by the gas generator 8. Alternatively, the chamber 10 may be closed off by a plate (not shown) made of a rigid material which is at least partially dislodged from the door 4 to uncover the chamber 10 when the airbag 6 is inflated.

The size of the chamber 10 may vary depending on the requirements. In addition, the air bag of the airbag 6 may also be formed directly from the fabric door 4.

Hence, safety is improved by the fabric door 4 with the integrated airbag 6 and the same level of occupant protection is achieved as in the case of motor vehicles with solid doors.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:
    a fabric door adapted for attachment to a motor vehicle for repeated movement between a closed position wherein it covers a side door opening defined by a body of the vehicle and an open position wherein it allows an occupant to enter and exit a passenger space of the vehicle through the door opening, the fabric door having
    a chamber defined therein and a tear-seam oriented toward the passenger space of the vehicle when the fabric door is in the closed position; and
    an airbag housed in the chamber when in a non-inflated state and inflatable by a gas generator.

2. The apparatus of claim 1, wherein the airbag is configured as a side airbag.

3. The apparatus of claim 1, wherein the airbag is configured as a curtain airbag.

4. The apparatus of claim 1, wherein the gas generator is secured to the body and in fluid connection with the airbag via a gas-conveying line.

5. The apparatus of claim 1, wherein the door comprises a window portion formed of a transparent material.

6. A fabric side door for a motor vehicle comprising:
    a panel formed of a flexible material and adapted for fastening to a vehicle body to at least partially cover a side door opening formed therein when the door is in a closed position and repeatedly movable to an open position wherein it allows an occupant to enter and exit a passenger space of the vehicle through the side door opening, the panel having an opaque section and a transparent window portion disposed above the opaque section, the window portion having a chamber formed therein; and
    an airbag housed in the chamber in a non-inflated state and inflatable by a gas generator.

7. The fabric side door of claim 6, wherein the airbag is configured as a side airbag.

8. The fabric side door of claim 6, wherein the airbag is configured as a curtain airbag.

9. The fabric side door of claim 6, wherein the gas generator is secured to the vehicle body and in fluid connection with the airbag via a gas-conveying line.

10. A motor vehicle comprising:
    a body defining a side door opening;
    a side door comprising at least one panel formed of a non-rigid material and secured to the body to cover at least a portion of the side door opening when in a closed position and repeatedly movable to an open position wherein it allows an occupant to enter and exit a passenger space of the vehicle through the side door opening;
    a chamber defined within the at least one panel; and
    an occupant protection airbag housed in a non-inflated condition within the chamber.

11. The motor vehicle of claim 10, wherein the airbag is configured as a side air bag.

12. The motor vehicle of claim 10, wherein the airbag is configured as a curtain air bag.

13. The motor vehicle of claim 10, further comprising a gas generator secured to the body and in fluid connection with the airbag.

* * * * *